US010129925B2

(12) United States Patent
Gupta et al.

(10) Patent No.: US 10,129,925 B2
(45) Date of Patent: Nov. 13, 2018

(54) RESUMPTION OF PDN CONNECTIONS FOR DEVICES REGAINING WLAN CONNECTIVITY

(71) Applicant: INTEL IP CORPORATION, Santa Clara, CA (US)

(72) Inventors: Vivek Gupta, San Jose, CA (US); Alexandre Saso Stojanovski, Paris (FR)

(73) Assignee: INTEL IP CORPORATION, Santa, CA (US)

( * ) Notice: Subject to any disclaimer, the term of this patent is extended or adjusted under 35 U.S.C. 154(b) by 74 days.

(21) Appl. No.: 15/507,708

(22) PCT Filed: Jun. 30, 2015

(86) PCT No.: PCT/US2015/038681
§ 371 (c)(1),
(2) Date: Feb. 28, 2017

(87) PCT Pub. No.: WO2016/057095
PCT Pub. Date: Apr. 14, 2016

(65) Prior Publication Data
US 2017/0257906 A1    Sep. 7, 2017

Related U.S. Application Data

(60) Provisional application No. 62/061,049, filed on Oct. 7, 2014.

(51) Int. Cl.
*H04W 76/38* (2018.01)
*H04W 76/16* (2018.01)
(Continued)

(52) U.S. Cl.
CPC ....... *H04W 76/38* (2018.02); *H04W 36/0022* (2013.01); *H04W 36/023* (2013.01); *H04W 76/16* (2018.02); *H04W 88/16* (2013.01)

(58) Field of Classification Search
CPC . H04W 76/38; H04W 76/16; H04W 36/0022; H04W 36/023; H04W 88/16
See application file for complete search history.

(56) References Cited

U.S. PATENT DOCUMENTS

2014/0273958 A1* 9/2014 Messana ............. H04L 63/0884
455/411
2015/0282011 A1* 10/2015 Watfa ................. H04W 36/0022
370/332

FOREIGN PATENT DOCUMENTS

JP    2016/506696 A    3/2016
JP    2017/526242 A    9/2017
(Continued)

OTHER PUBLICATIONS

3GPP TS 29.274 V12.6.0: Evolved General Packet Radio Service (GPRS) Tunnelling Protocol for Control plane (GTPv2-C); Stage 3 (Release 12) (Sep. 2014).
(Continued)

*Primary Examiner* — Habte Mered
(74) *Attorney, Agent, or Firm* — Thorpe North & Western (57) ABSTRACT

Technology that allows PDN connections for a UE to be resumed efficiently after WLAN connectivity is lost and then regained are disclosed. A UE can have a multi-legged or multi-access packet-data-network (PDN) connection that is used to communicate with a WLAN and with an eNB. When WLAN connectivity is lost, the UE can send a WLAN-connectivity-loss communication to a PDN-GW via the eNB. A TWAG can also detect that the UE's WLAN connectivity has been lost and can send a suspension communication to the PDN-GW. The TWAG can also store PDN context information for the UE for a predefined period of time. When the UE regains WLAN connectivity, the UE can send a WLAN-link-control-protocol (WLCP) communica-
(Continued)

tion to the TWAG indicating that the UE wishes to resume one or more PDN connections that were previously suspended.

24 Claims, 7 Drawing Sheets (51) Int. Cl.
*H04W 36/00* (2009.01)
*H04W 36/02* (2009.01)
*H04W 88/16* (2009.01)

(56) References Cited

FOREIGN PATENT DOCUMENTS

| WO | 2014056983 A1 | 4/2014 |
|---|---|---|
| WO | WO 2014/107527 A1 | 7/2014 |
| WO | 2014137184 A1 | 9/2014 |
| WO | WO 2016/004119 A1 | 1/2016 |

OTHER PUBLICATIONS

3GPP TS 24.244 V12.0.0: Wireless LAN control plane protocol for trusted WLAN access to EPC; Stage 3 (Release 12) (Sep. 2014).
3GPP TR 23.861 V1.8.0: Network based IP flow mobility (Release 13) (May 2014).
3GPP TS 24.312 V12.6.0: Access Network Discovery and Selection Function (ANDSF) Management Object (MO) (Release 12) (Sep. 2014).
3GPP TS 24.327 V12.0.0: Mobility between 3GPP Wireless Local Area Network (WLAN) interworking (I-WLAN) and 3GPP systems; General Packet Radio System (GPRS) and 3GPP I-WLAN aspects; Stage 3 (Release 12) (Sep. 2014).
3GPP TS 24.303 V12.0.0: Mobility management based on Dual-Stack Mobile IPv6; Stage 3 (Release 12) (Sep. 2014).
3GPP TS 23.402 V12.6.0: Architecture enhancements for non-3GPP accesses (Release 12) (Sep. 2014).
B. Adoba, Ed.; Internet Architecture Board (IAB); Network Working Group: Architectural Implications of Link Indications; Mar. 1, 2007.

\* cited by examiner

| WLCP PDN CONNECTIVITY RESUME Message ||||
| Information Element | Type/Reference | Presence | Format |
| --- | --- | --- | --- |
| PDN connectivity resume message identity | Message type | M | V |
| Procedure transaction identity | Transaction identifier | M | V |
| Access point name | Access point name | M | TLV |
| PDN Address | PDN address | M | TLV |
| PDN connection ID | PDN connection ID | M | TLV |
| User Plane Connection ID | User Plane Connection ID | M | TLV |
| Protocol configuration options | Protocol configuration options | O | TLV |

302 — PDN connectivity resume message identity
304 — Procedure transaction identity
306 — Access point name
308 — PDN Address
310 — PDN connection ID
312 — User Plane Connection ID
314 — Protocol configuration options

RESUMPTION OF PDN CONNECTIONS FOR DEVICES REGAINING WLAN CONNECTIVITY

BACKGROUND

Updates in third generation partnership project (3GPP) release 12 standards specify that a trusted wireless local area network (WLAN) can connect to a trusted WLAN access gateway (TWAG) in an evolved packet core (EPC) and can have multiple concurrent packet-data-network (PDN) connections established using an S2a interface. Using Network-based Internet Protocol (IP)-flow Mobility (NBIFOM), user equipments (UEs) can have multiple concurrent IP flows via different radio access technologies (RATs). A UE can, for example, be concurrently connected to both a WLAN and a 3GPP LTE network and can use both connections in parallel to achieve improved overall data-transfer performance.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

Acronym Explanations for the Present Disclosure

3GPP: 3rd Generation Partnership Project. A joint standardization partnership responsible for standardizing UMTS, HSPA and LTE. See www.3gpp.org.

EPC: Evolved Packet Core. The Core Network (CN) in the LTE/System Architecture Evolution (SAE) system. The EPC is generally responsible for the overall control of UEs and establishment of the bearers. The main logical nodes of an EPC are generally the Packet Data Network GateWay (P-GW), Serving-GateWay (S-GW) and Mobility Management Entity (MME).

IP: Internet Protocol. A protocol which provides for transmitting blocks of data from sources to destinations over an interconnected system of networks (e.g., the internet). The sources and destinations are identified by fixed-length addresses. See IETF RFC791, www.ietf.org.

GSM: Global System for Mobile Communications. A globally-deployed standardized digital mobile communication system, considered to be a second generation ("2G") system. The specifications are maintained and developed by 3GPP. See www.3gpp.org.

UMTS: Universal Mobile Telecommunications System. A third-generation radio access technology standardized by 3GPP. It generally uses Wideband Code Division Multiple Access (WCDMA) as the underlying air interface.

LTE: Long-Term Evolution. A fourth-generation (4G) wireless broadband technology developed by the 3GPP.

HSPA: High-Speed Packet Access. The marketing term encompassing both High-Speed Downlink Packet Access (HSDPA) and High-Speed Uplink Packet Access (HSUPA) enhancements to Wideband Code Division Multiple Access, sometimes considered to be "3.5G."

UTRAN: Universal Terrestrial Radio Access Network. UTRAN comprises Radio Network Controllers (RNCs) and nodes (e.g., node Bs) of a UMTS network. It allows connectivity between a UE and a core network.

E-UTRAN: Evolved Universal Terrestrial Radio Access Network. Generally comprises eNBs that provide a User-plane (U-Plane) Packet Data Convergence Protocol (PDCP) layer, a Radio Link Control (RLC) layer, a Medium Access Control (MAC) layer, and a Physical (PHY) layer, along with Control-plane (C-Plane) Radio Resource Control (RRC) protocol terminations towards one or more UE. The eNBs in an E-UTRAN can generally be interconnected with each other by means of an X2 interface. The eNodeBs are generally connected to an EPC via an S1 interface.

GPRS: General Packet Radio Service. A mobile data service extension to the GSM system. It is often described as "2.5G". See 3GPP TS 43.064 and 3GPP TS 23.060.

GTP: GPRS Tunneling Protocol. This is an IP-based protocol used in GSM, UMTS and LTE networks. It consists of GTP for both User plane and Control plane (GTP-U and GTP-C respectively). See 3GPP TS29.274 for GTP within LTE networks.

S2a: a type of network interface. See 3GPP TS 29.274 and 3GPP TS 29.275.

SaMOG: S2a Mobility Based on GTP. See 3GPP TS 23.402.

WLAN: Wireless Local Area Network. See 3GPP TS 24.327, 3GPP TS 24.312, and 3GPP TS 23.402.

WLCP: WLAN control protocol. WLCP refers to a protocol for control signaling between a User Equipment (UE) and a Trusted WLAN Access Gateway (TWAG). Control signaling based on the WLCP messages can be used, for example, to provide session management functionality for Packet Data Network (PDN) connections. For example, WLCP can be used to establish a PDN connection, hand over a PDN connection, request that a UE release a PDN connection, and notify a UE that a PDN connection has been released. Since WLCP is a protocol between the UE and the TWAG, it is not necessary that intermediate nodes (e.g., Access Points) between the UE and the TWAG support or understand WLCP.

UE: User Equipment. A mobile unit which allows a user to access network services, connecting to a UTRAN or E-UTRAN via a radio interface. A UE generally comprises at least a Universal Integrated Circuit Card (UICC) and a Mobile Equipment (ME). See 3GPP TS21.905 Section 3.

eNB: Evolved Node B. The base station generally used in LTE systems. An eNB can serve one or more E-UTRAN cells.

PDN: Packet Data Network. A network through which a UE obtains a packet data connection to the internet. See 3GPP TS29.274.

PDN-GW (also called P-GW or) PGW: PDN Gateway. A PGN-GW provides connectivity from a UE to external packet data networks by being the point of exit and entry of traffic for the UE. A UE may have simultaneous connectivity with more than one PGN-GW for accessing multiple PDNs. The PGN-GW generally performs policy enforcement, packet filtering for each user, charging support, lawful interception and packet screening. The PGN-GW may also act as an anchor for mobility between 3GPP and non-3GPP technologies PMIP: Proxy Mobile Internet Protocol. A network-based mobility management mechanism. It is an amendment to Mobile IPv6 which allows mobility control to be moved from a mobile node to a proxy in the network. In general, LTE supports PMIP over the S2, S5 and S8 interfaces. See 3GPP TS23.402.

TWAG: Trusted WLAN Access Gateway. In trusted WLAN access, a UE is connected to a TWAG in the core of a WLAN; the TWAG, in turn, is connected to a P-GW (Packet Gateway) in an EPC through a secure tunnel (e.g., GTP or PMIP) by an S2a interface.

IFOM: IP-flow Mobility. This refers to technology that allows a telecom operator to switch an IP flow from a first radio access technology (RAT) to a different RAT without disrupting other ongoing connections on both RATs and while maintaining service continuity. The technology is currently being standardized by the Internet Engineering Task Force (IETF), and it has been adopted by the 3GPP. See 3GPP TS 24.303 and 3GPP TS 24.327.

NBIFOM: Network-based IP-flow Mobility.

AP: Access Point in a WLAN.

BSS: Basic Service Set. This refers to the set of stations (STAs) (e.g., UEs) that are wirelessly connected to a WLAN via a single specific AP. The STAs are generally found in the AP's basic service area (BSA). A BSS is identified by a basic service set identification (BSSID).

ESS: Extended Service Set. A plurality of interconnected wireless BSSs that share the same SSID (network name), security credentials, and integrated (e.g., providing translation between 802.3 and 802.11 frames) WLANs that appear as a single BSS to the logical-link-control layer at stations associated with one of the BSSs in the ESS.

MCM: multi-connection mode for SaMOG-2.

MME: Mobility Management Entity. This is a control node that processes the signaling between a UE and a Core Network (CN) and provides Visitor Location Register (VLR) functionality for an Evolved Packet System (EPS). An MME can support functions related to bearer and connection management. See 3GPP TS23.002 Section 4.1.4.1, TS24.301, TS36.300 Section 19, and TS36.401.

L2: Layer 2. This refers to the data link layer of the Open Systems Interconnection (OSI) model. In general, the data link layer is directed to moving data across physical links in a network. A network switch can be a device that redirects data messages at the layer-2 level using destination Media Access Control (MAC) addresses to determine the messages are to be sent. The data link layer comprises two sublayers: the Media Access Control (MAC) sublayer and the Logical Link Control (LLC) sublayer.

L3: Layer 3. This refers to the network layer of the Open Systems Interconnection (OSI) model. In general, the network layer provides functional and procedural means of transferring variable length data sequences (e.g., datagrams) from one node to another connected to the same network.

C-Plane: Control Plane. In the Open Systems Interconnection (OSI) model, control data is generally transported using the C-plane.

U-Plane: User Plane. In the Open Systems Interconnection (OSI) model, user data is generally transported using the U-Plane.

DL: downlink.

PCO: Protocol Configuration Options. These are generally used to transfer parameters between a UE and a Packet Data Network Gateway (P-GW). They are sent transparently through a Mobility Management Entity (MME) and a Serving GW (S-GW). See 3GPP TS23.401 Section 5.3.2

UDP: User Datagram Protocol. A transport layer protocol that is generally used along with the Internet Protocol (IP). See IETF RFC768.

Since many APs have relatively small coverage areas, UEs connected to a WLAN AP can frequently move in and out of the AP's basic service area (BSA). In addition, UEs can often move from the BSA of a first AP into the BSA of a second AP while remaining in the same WLAN extended service set (ESS). UEs can also frequently move from a first WLAN ESS into a second WLAN ESS. In some cases, the WLAN ESSs may be connected to the same TWAG. In other cases, the WLAN ESSs may be connected to different TWAGs.

The SAMOG-2 work item in 3GPP release 12 has not addressed mobility across TWAGs and TWAG re-selection/relocation of UE context for UEs that frequently move into and out of WLAN coverage. Thus, when a UE configured to operate based on 3GPP-release-12 (REL12) that is concurrently connected to a WLAN and a 3GPP network moves out of the coverage area of the WLAN, the UE's PDN connections to the WLAN will likely be transferred to the 3GPP network. When the UE moves out of the coverage area of the WLAN, the UE context on a TWAG is lost. When the UE re-enters the coverage area of the WLAN (or enters the coverage area of another WLAN), the PDN connections can be rerouted and flows can be re-established over WLAN access. When the UE re-enters the WLAN coverage area, the UE context on the TWAG is recreated. If the UE frequently goes into and out of WLAN coverage areas, the repeated loss and recreation of UE context on the TWAG can consume system resources and can cause inconvenient performance delays.

Systems and technologies in accordance with the present disclosure enable a UE context on a TWAG to be preserved for a period of time when a UE moves out of the coverage area of a WLAN that is connected to the TWAG. If the UE reconnects to the same WLAN or another WLAN that is connected to the same TWAG within the period of time in which UE context is preserved, recreation of the UE context can be avoided.

In some examples consistent with the present disclosure, a UE can have an NBIFOM multi-legged or multi-access PDN connection through an AP in a WLAN. The WLAN can be connected to a TWAG in an EPC. The TWAG, in turn, can be connected to a PGW via an S2a interface. If the UE loses connectivity with the WLAN (e.g., by moving out of the coverage area of the AP), it is helpful if the PGW can be promptly notified so that the PGW can promptly stop sending downlink (DL) packets to the UE via the S2a interface upon receiving the notification.

If the UE also has a 3GPP connection, the UE can be configured to send a WLAN-connectivity-loss communication to the PGW via the 3GPP connection to notify the PGW when WLAN connectivity has been lost. Additionally or alternatively, the TWAG can be configured to detect that the UE has lost WLAN connectivity based on L2 triggers and/or link indications (e.g., L2 link attach/detach trigger messages/notifications) sent to the TWAG from the AP. The TWAG, upon detecting that the UE's connectivity with the WLAN has been lost, can be configured to send a suspension communication to the PGW indicating that the PGW should suspend sending data to the UE via the S2a interface. This can keep the TWAG from having to handle/buffer U-plane packets that the PGW might otherwise send to the UE via the TWAG while the UE is disconnected from the WLAN. These packets would likely be lost, thus causing re-transmissions at higher layers.

The suspension communication may be contained in a Modify Session Request message or in an S2a message (referred to hereafter as a Suspend PDN request) that is specifically defined for the purpose of conveying the suspension communication. The TWAG can also be configured to suspend deleting PDN context information relating to the UE for a period of time after the loss of the UE's connectivity with the WLAN has been detected. By preserving the PDN context information relating to the UE, the TWAG can maintain C-plane context.

If the UE regains connectivity with an AP in a WLAN (which may be the same as the previous AP and/or WLAN or may be a different WLAN) that is connected to the same TWAG, the UE may have a new IP address and/ or a new UDP port. The UE can be configured to assist the TWAG in retrieving the PDN context information by sending a WLAN-link-control-protocol (WLCP) communication to the TWAG indicating that the UE wishes to resume the PDN connection. The WLCP communication can comprise a previously allocated IP address, a PDN address, a PDN connection ID, a user plane connection ID assigned as part of the previous PDN connection setup, a plurality of PCO parameters, a pointer to the previously established PDN context information relating to the UE, and/or other information. The WLCP communication may be contained in a PDN Connectivity request message in a WLCP PDN Connectivity Resume message that is specifically defined for the purpose of conveying the WLCP communication. The TWAG can be configured to send a resumption communication to the PGW indicating that the PGW can resume sending data to the UE via the S2a interface. The resumption communication may be contained in a Modify Session Request message or in an S2a message (referred to hereafter as a Resume PDN request) that is specifically defined for the purpose of conveying the resumption communication.

Figure 1:
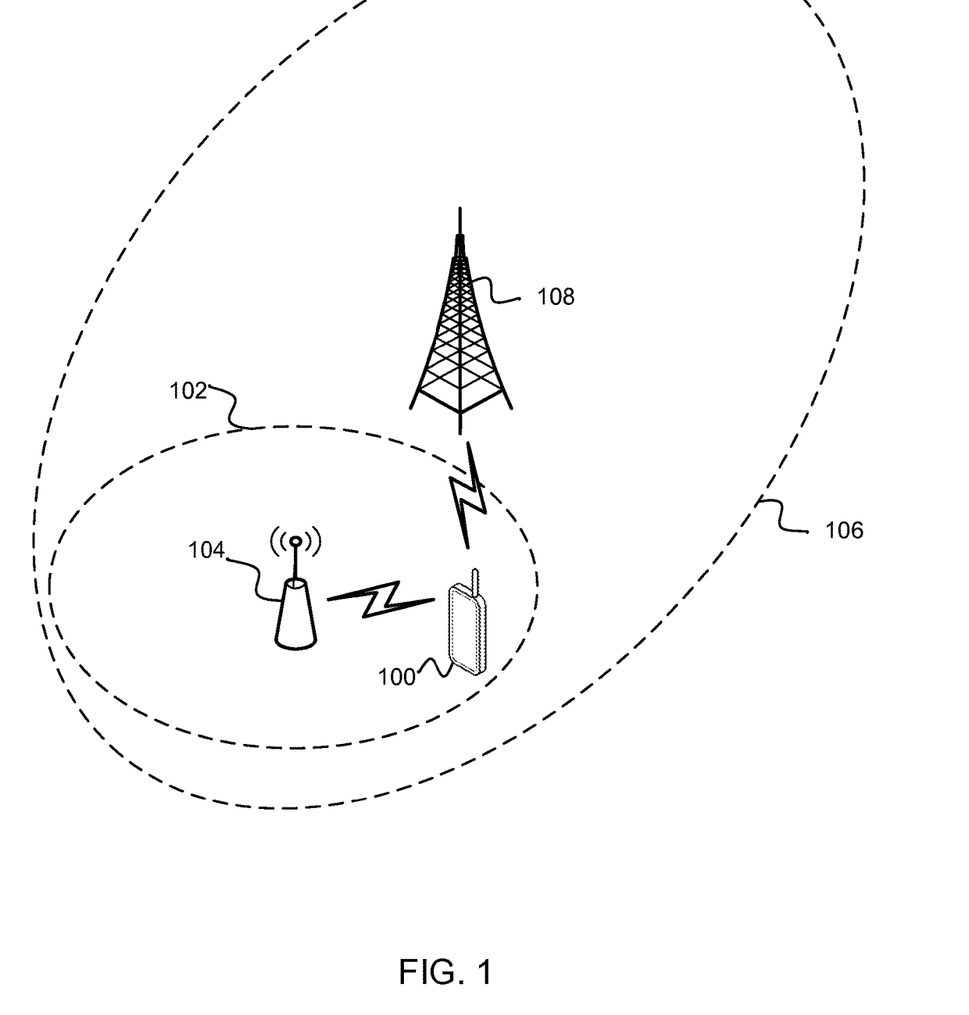
FIG. 1 is a diagram illustrating an exemplary scenario in which a UE can have concurrent IP flows via different RATs in accordance with an example.

FIG. 1 is a diagram illustrating an example of a scenario in which a UE 100 can have concurrent IP flows via different RATs. A UE 100 can be positioned within both a WLAN coverage area 102 of an access point (AP) 104 and an eNB coverage area 106 of an eNB 108. The UE 100 can comprise a transceiver module comprising multiple antennas. Using the transceiver module, the UE 100 can establish an IP flow with the AP 104 and an IP flow with the eNB. By having these concurrent IP flows, the UE 100 may be able to use the IP flow with the AP for one purpose (e.g., downloading data for a browsing application or a video-streaming service) and the IP flow with the eNB for another purpose (e.g., transferring voice data for a telephone call). If the UE 100 is in a SAMOG-2 MCM mode, the UE 100 can have multiple concurrent PDN connections via a WLAN to which the AP 104 pertains. The legs of a multi-legged or multi-access PDN connection that can comprise the IP Flows can use various radio access technologies (RATs). Some examples of RATs that may be used include Wideband Code Division Multiple Access (WCDMA) (e.g., release 99), Institute of Electrical and Electronics Engineers (IEEE) 802.16 Worldwide Interoperability for Microwave Access (WiMAX) (e.g., 802.16-2012, 802.16.1-2012, 802.16.1a-2013, etc.), Institute of Electrical and Electronics Engineers (IEEE) 802.11 Wireless Local-Area Network (WLAN) (e.g., releases 802.11a, 802.11b, 802.11ac, 802.11 ay, etc.), or Third Generation Partnership Project (3GPP) standards (e.g., 3GPP LTE releases 8-12).

Figure 2:
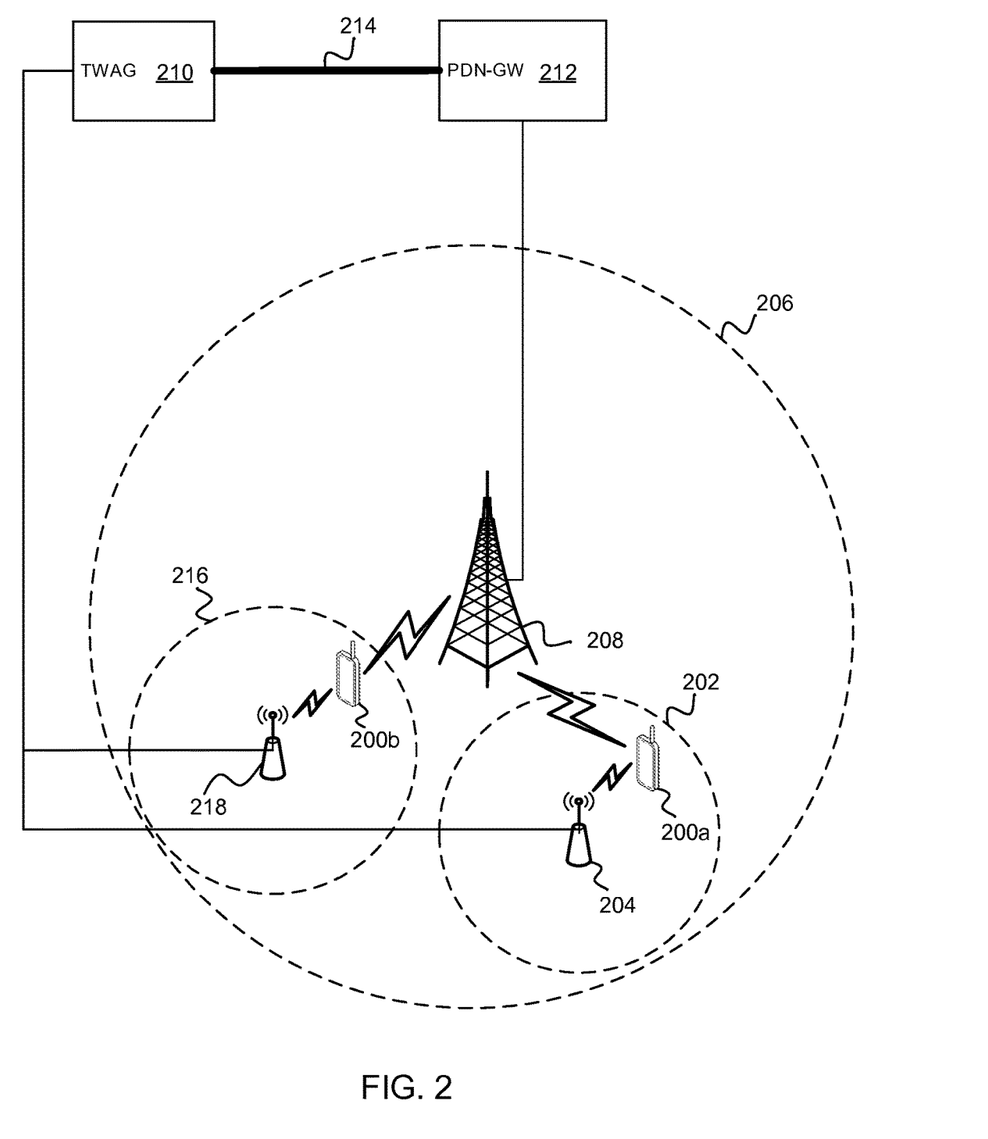
FIG. 2 is a diagram illustrating how a UE can lose and regain WLAN connectivity in accordance with an example.

FIG. 2 is a diagram illustrating how a UE 200*a*-*b* can lose and regain WLAN connectivity in accordance with an example. A UE 200*a* can be in a coverage area 202 of an AP 204 and also in a coverage area 206 of an eNB 208. The UE 200*a* can have concurrent IP flows to the AP 204 and the eNB 208. The AP 204 can be connected to a TWAG 210. The TWAG 210 can be in communication with a PDN-GW 212 via an S2a interface 214. The UE 200*a* can be moved a new position, as represented by the UE 200*b*. Since the UE 200*b* is outside of the coverage area 202 of the AP 204, connectivity with the AP 204 is lost at some point during the movement from the position of the UE 200*a* to the position of the UE 200*b*. When connectivity with the AP 204 is lost, the UE can send a WLAN-connectivity-loss communication to the PDN-GW 212 via the eNB 208 to notify the PDN-GW 212 that WLAN connectivity has been lost. In addition (or alternatively), the TWAG 210 can detect that the UE has lost contact with the WLAN that includes AP 204 based on a trigger communication sent to the TWAG 210 from the AP 204 via L2 or L3 transport. The trigger communication can include the IP address of the UE 200*a,* the BSSID (MAC address of the UE), and/or the reason for the trigger communication (e.g., abrupt loss of connection as opposed to explicit disassociation).The AP 204 and the TWAG 210 may be collocated or may be connected via an access controller. The TWAG 210 can then send a suspension communication to the PDN-GW 212, via the S2a interface 214, indicating that the PDN-GW (PGW) 212 should suspend sending data to the UE 200*b* via the path comprising the S2a interface 214, the TWAG 210, and the AP 204. The suspension communication can be contained in a Modify Session Request message or in a Suspend PDN request. The TWAG 210 can also be configured to suspend deleting PDN context information relating to the UE 200b for a period of time. The PDN-GW can then begin directing incoming downlink packets for the UE 200a that would have otherwise been sent to the UE 200a via the path comprising the S2a interface 214, the TWAG 210, and the AP 204 to be sent through the eNB 208 using 3GPP access.

The UE 200b can then be in a coverage area 216 of an AP 218. The UE 200b can establish a connection with the AP 218. The AP 218 can send an L2 UE attach trigger message to the TWAG 210 indicating that the UE has regained WLAN connectivity. The UE 200b can then send a WLAN-link-control-protocol (WLCP) communication to the TWAG 210 via the AP 218 indicating that the UE 200b wishes to resume one or more PDN connections over WLAN that were being used previously. The WLCP communication can comprise a previously allocated IP address, a PDN address, a PDN connection ID, a user plane connection ID assigned as part of the previous PDN connection setup (or a new user plane connection ID assigned by the TWAG 210), a plurality of PCO parameters, a pointer to the previously established PDN context information relating to the UE, and/or other information. The WLCP communication may be contained in a PDN Connectivity request message or in a WLCP PDN Connectivity Resume message. The TWAG 210, upon receiving the WLCP communication, can send a resumption communication to the PDN-GW 212 requesting that the PDN-GW 212 resume the one or more PDN connections over WLAN. The resumption communication can be sent via the S2a interface 214. The resumption communication may be contained in a Modify Session Request message or in a Resume PDN request. The TWAG can then send a WLCP PDN Connectivity Resume Complete message or a WLCP PDN Connectivity Accept message to the UE 200b indicating whether the one or more PDN connections were successfully resumed and providing any updated parameters.

Figure 3:
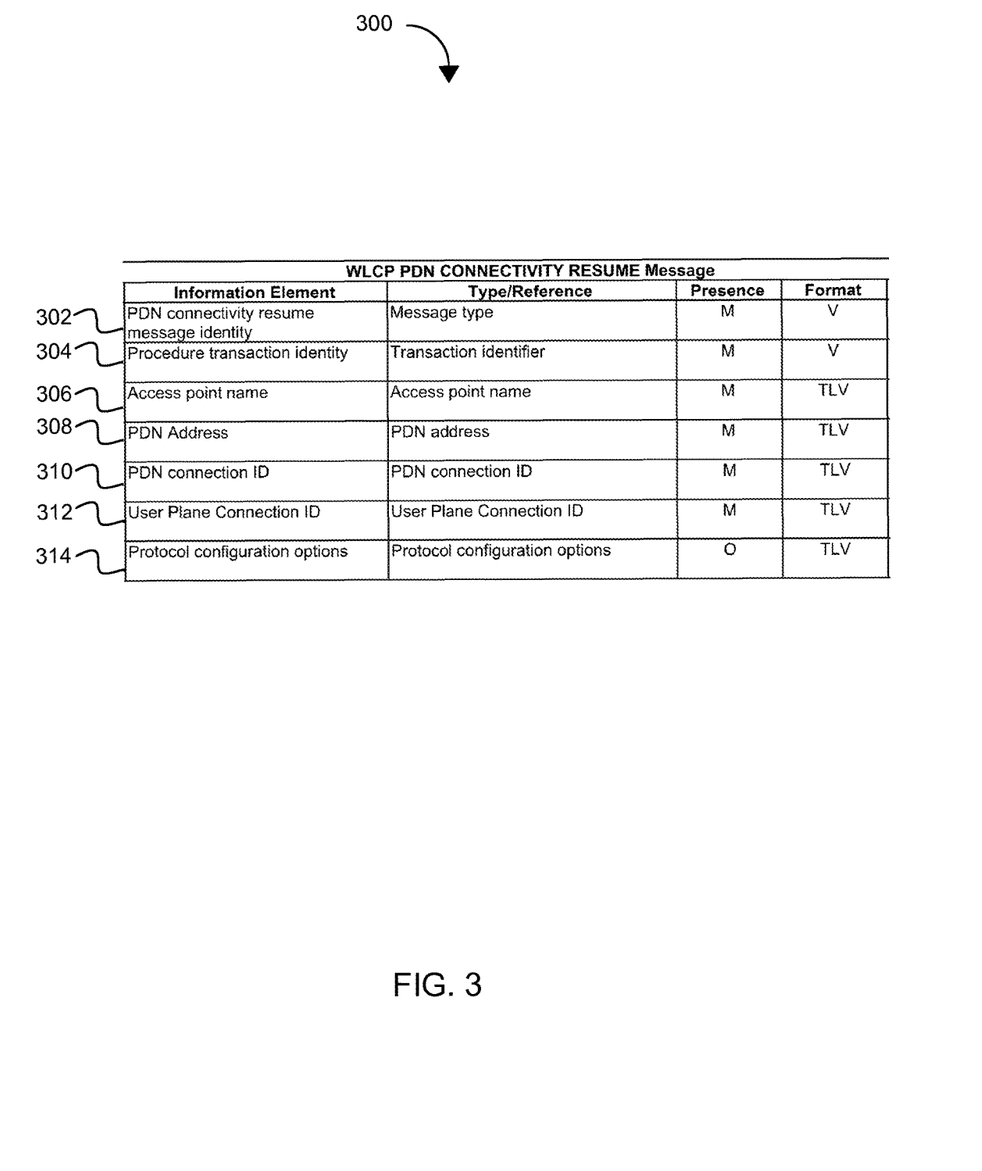
FIG. 3 illustrates a table depicting an exemplary set of information elements that may be contained in a WLCP PDN Connectivity Resume message in accordance with an example.

FIG. 3 illustrates a table 300 depicting an exemplary set of information elements that may be contained in a WLCP PDN Connectivity Resume message. In one example, a WLCP PDN Connectivity Resume message can comprise a PDN Connectivity Resume message identity 302 to identify the message type. The WLCP PDN Connectivity Resume message can also comprise a procedure transaction identity 304 to identify a transaction pertaining to the message. The WLCP PDN Connectivity Resume message can also comprise an access point name 306 to identify an AP associated with the message. The WLCP PDN Connectivity Resume message can also comprise a PDN address 308 to identify an IP address that was previously allocated to a UE that is seeking to resume one or more PDN connections. The WLCP PDN Connectivity Resume message can also comprise a PDN connection ID 310. The WLCP PDN Connectivity Resume message can also comprise a user plane connection ID 312 that is an identifier previously allocated to the UE. Alternatively, the user plane connection ID 312 may be an identifier that has been newly assigned to the UE by a TWAG. The WLCP PDN Connectivity Resume message can also comprise protocol configuration options 314.

Figure 4:
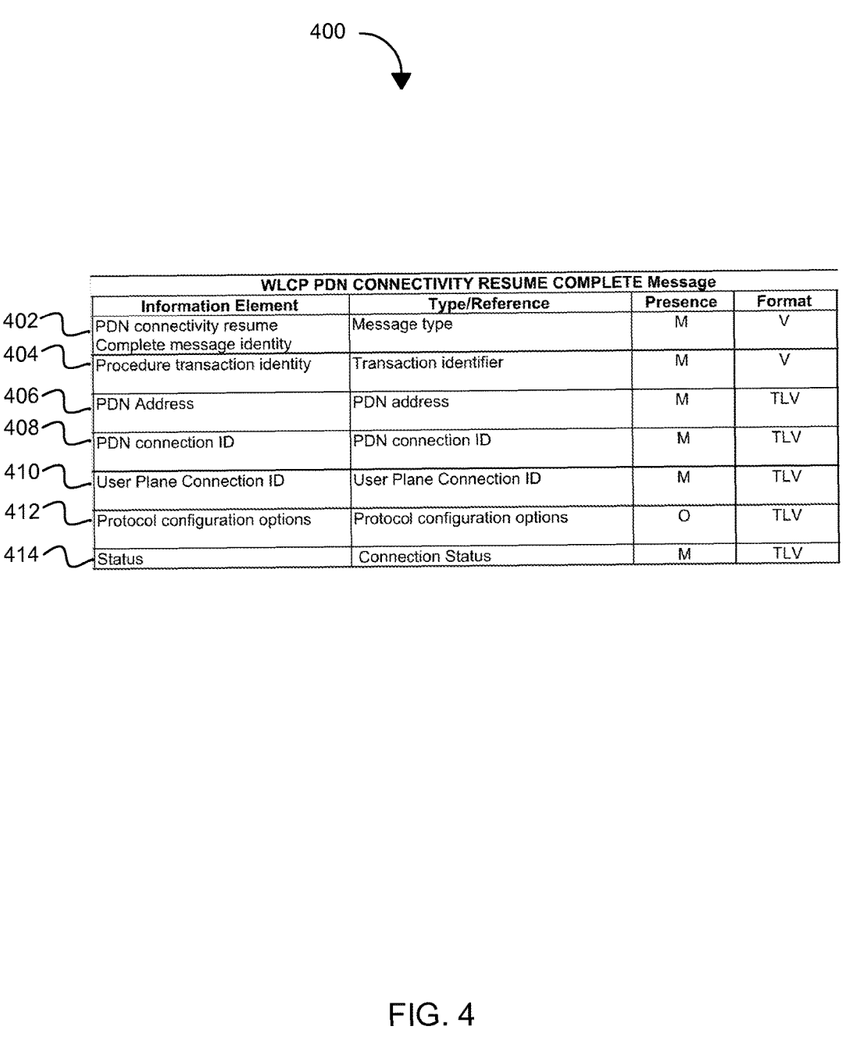
FIG. 4 illustrates a table depicting an exemplary set of information elements that may be contained in a WLCP PDN Connectivity Resume Complete message in accordance with an example.

FIG. 4 illustrates a table 400 depicting an exemplary set of information elements that may be contained in a WLCP PDN Connectivity Resume Complete message. In one example, a WLCP PDN Connectivity Resume Complete message can comprise a PDN Connectivity Resume Complete message identity 402 to identify the message type. The WLCP PDN Connectivity Resume Complete message can also comprise a procedure transaction identity 404 to identify a transaction pertaining to the message. The WLCP PDN Connectivity Resume Complete message can also comprise a PDN address 406 to identify an IP address that was previously allocated to a UE that is seeking to resume one or more PDN connections. The WLCP PDN Connectivity Resume Complete message can also comprise a PDN connection ID 408. The WLCP PDN Connectivity Resume Complete message can also comprise a user plane connection ID 410 that is an identifier previously allocated to the UE. Alternatively, the user plane connection ID 410 may be an identifier that has been newly assigned to the UE by a TWAG. The WLCP PDN Connectivity Resume Complete message can also comprise protocol configuration options 412. The WLCP PDN Connectivity Resume Complete message can also comprise a status 414 that indicates whether one or more PDN connections were successfully resumed.

Figure 5:
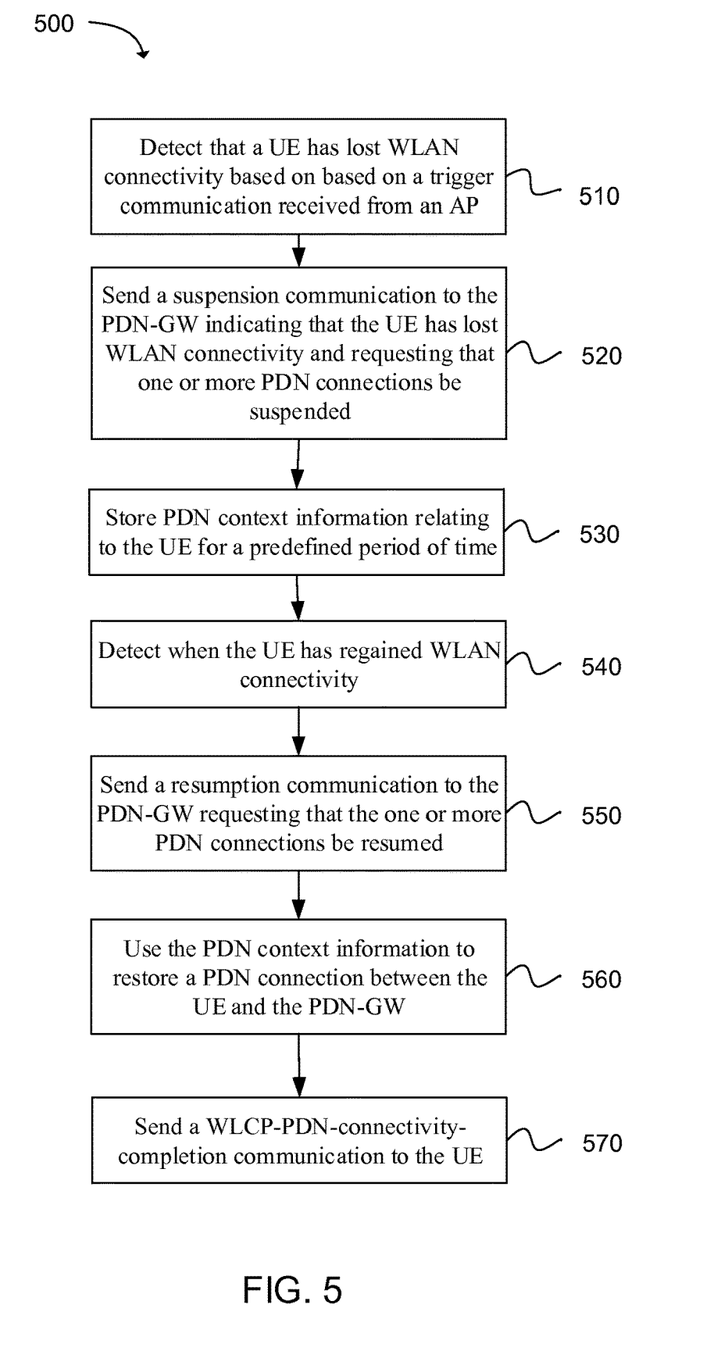
FIG. 5 is a flow diagram illustrating exemplary functionality of a TWAG operable to assist in improved resumption of PDN connections for UEs regaining WLAN connectivity in accordance with an example.

FIG. 5 is a flow diagram illustrating exemplary functionality 500 of a TWAG operable to assist in improved resumption of PDN connections for UEs regaining WLAN connectivity. The functionality can be implemented as a method or the functionality can be executed as instructions on a machine, where the instructions are included on at least one non-transitory computer-readable storage medium. As in block 510, circuitry (e.g., including a processing module comprising one or more processors) at the TWAG can detect that a UE has lost WLAN connectivity based on a trigger communication received from an AP. The trigger communication may be received via L2 or L3 transport and can comprise an IP address of the UE, a media-access-control (MAC) address, and/or a reason that coverage was lost. The circuitry can be configured to process control signaling with the UE based on WLAN Link-Control-Protocol (WLCP) messages. As in block 520, a circuitry at the TWAG (e.g., a network module) can send a suspension communication to a PDN-GW indicating that the UE has lost WLAN connectivity and requesting that one or more PDN connections be suspended. The suspension communication can be contained in a modify session request. The PDN-GW can be configured to suspend sending data to the UE via an S2a interface upon receiving the suspension communication. As in block 530, one or more digital memory devices associated with the TWAG can store PDN context information relating to the UE. The PDN context information can be stored on the one or more digital memory devices for a predefined period of time. Hence, for that predefined period of time after the suspension communication is received at the PDN-GW, the PDN context information can remain stored on the one or more digital memory devices.

As in block 540, the circuitry (e.g., including a processing module) can detect when the UE has regained WLAN connectivity. The circuitry may detect that the UE has regained WLAN connectivity based on a WLAN-link-control-protocol (WLCP) communication received (e.g., via a network module) from the UE. The WLCP communication can comprise an IP address previously assigned to the UE and/or a user-plane-connection identifier previously allocated to the UE (or newly assigned to the UE by the TWAG). As in block 550, the circuitry (e.g., a network module) can send a resumption communication to the PDN-GW requesting that the one or more PDN connections be resumed. The resumption communication may be contained in a modify session request. As in block 560, the processing module can retrieve the PDN context information from the one or more memory devices and use the PDN context information to restore a PDN connection between the UE and the PDN- GW. As in block 570, the circuitry (e.g., a network module) can send a WLCP-PDN-connectivity-completion communication to the UE once the PDN connection between the UE and the PDN-GW has been restored.

Figure 6:
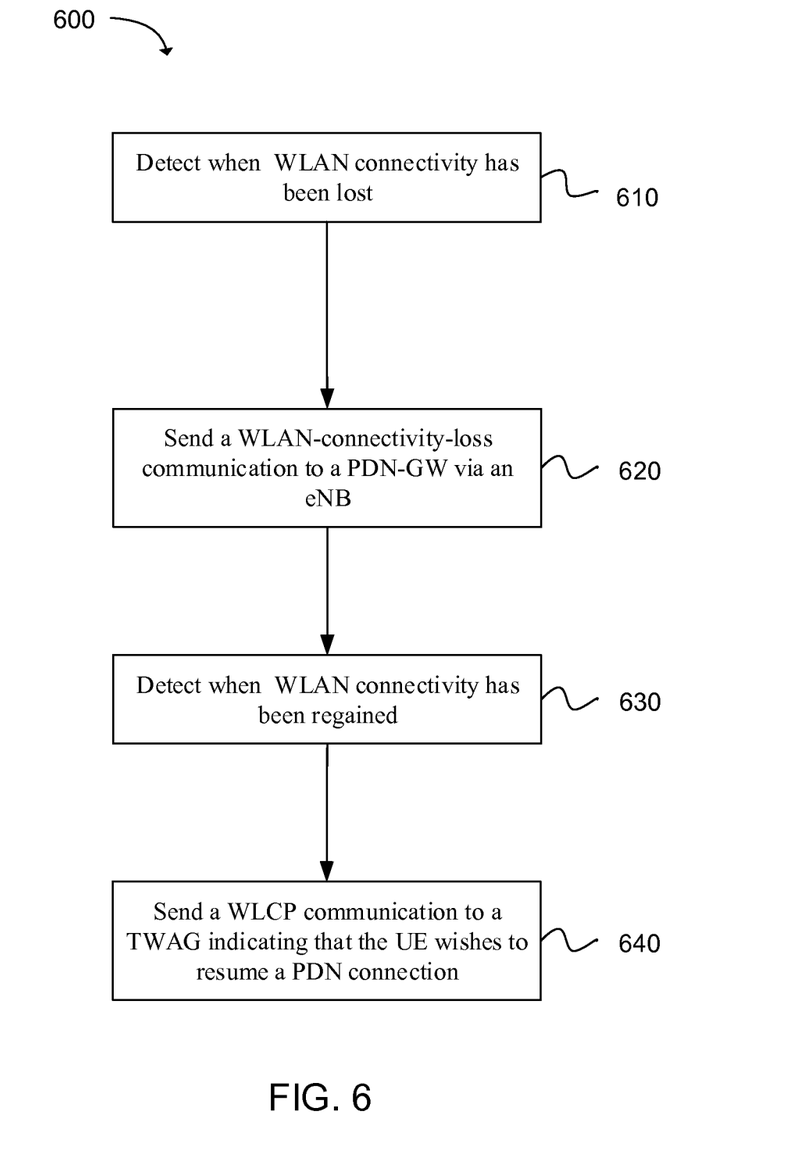
FIG. 6 is a flow diagram illustrating exemplary functionality of a UE that is capable of having a multi-legged or multi-access packet-data-network (PDN) connection using more than one radio access technology (RAT) in accordance with an example.

FIG. 6 is a flow diagram illustrating exemplary functionality 600 of a UE that is capable of having a multi-legged or multi-access packet-data-network (PDN) connection using more than one radio access technology (RAT). The UE can communicate, for example, with an evolved node B (eNB) in a cellular network and with an access point (AP) in a wireless local area network (WLAN). The WLAN can be configured to communicate with a trusted wireless-local-area-network access gateway (TWAG) and the TWAG can be configured to communicate with a packet-data-network gateway (PDN-GW) of an EPC via an S2a interface. In some examples, the UE can communicate with the eNB using a first leg of a multi-legged PDN connection and with the AP using a second leg of the multi-legged PDN connection. The first leg of the multi-legged PDN connection can use, for example, at least one of the following radio access technologies (RATs): Wideband Code Division Multiple Access (WCDMA), Institute of Electrical and Electronics Engineers (IEEE) 802.16 Worldwide Interoperability for Microwave Access (WiMAX), or Third Generation Partnership Project (3GPP) standard RAT. The second leg of the multi-legged PDN connection can use, for example, at least one of the following radio access technologies (RATs): Institute of Electrical and Electronics Engineers (IEEE) 802.11 Wireless Local-Area Network (WLAN), IEEE 802.16 Worldwide Interoperability for Microwave Access (WiMAX), or Bluetooth.

As in block 610, an apparatus of a UE can comprise circuitry (e.g., a processing module comprising one or more processors) that can detect when the UE has lost WLAN connectivity. As in block 620, circuitry (e.g., a transceiver module) at the UE can send a WLAN-connectivity-loss communication to a PDN-GW via an eNB to which the UE is connected. The PDN-GW can be configured to suspend a PDN connection to the UE via an S2a interface (e.g., A PDN connection in which the PDN-GW forwards data for the UE to a TWAG using an S2a interface and the TWAG forwards the data to an AP that wirelessly transmits the data for the UE) upon receiving the WLAN-connectivity-loss communication. As in block 630, the circuitry (e.g., a processing module) can subsequently detect when WLAN connectivity has been regained within a predetermined time after first detecting the loss of connectivity with the WLAN. As in block 640, the circuitry (e.g., a transceiver module) can send a WLCP communication to a TWAG indicating that the UE wishes to resume a PDN connection that was lost when the UE lost WLAN connectivity. The WLCP communication can comprise a PDN address, a PDN connection ID, a user plane connection ID, and/or a plurality of protocol-configuration-options (PCO) parameters.

Figure 7:
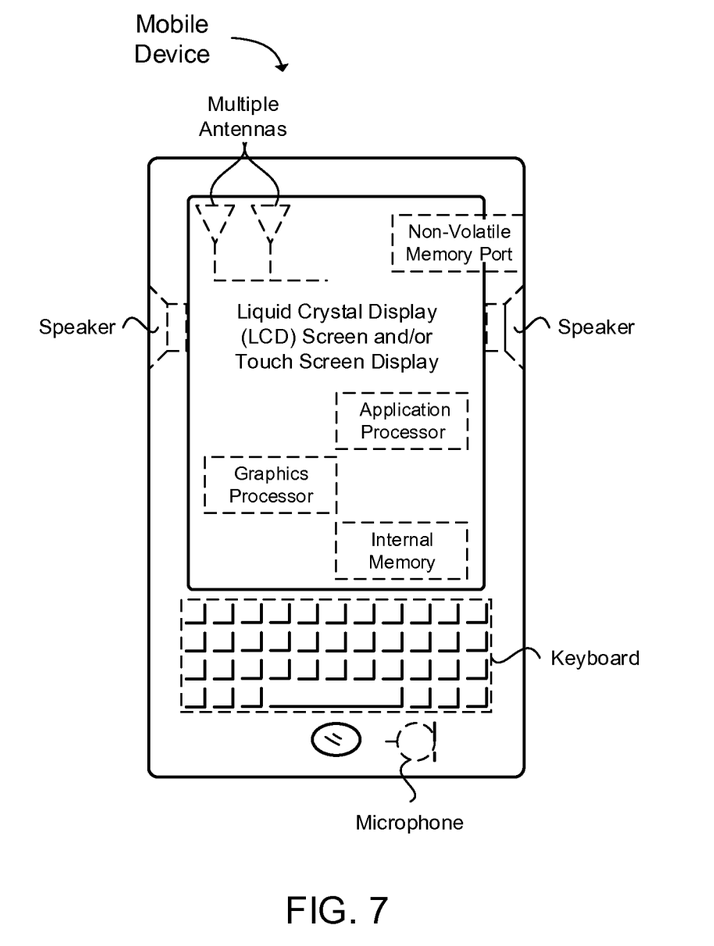
FIG. 7 provides an example illustration of the wireless device in accordance with an example.

FIG. 7 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general-purpose processors, specialized processors such as VLSI, FPGAs, and other types of specialized processors, as well as base-band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment of the present disclosure. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present disclosure can be referred to herein along with alternatives for the various components thereof It is understood that such embodiments, examples, and alternatives are not to be construed as de facto equivalents of one another, but are to be considered as separate and autonomous representations.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that the some embodiments can be practiced without one or more of the specific details, or with other methods, components, layouts, etc. In other instances, well-known structures, materials, or operations are not shown or described in detail to avoid obscuring aspects of the disclosure.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the claimed matter be limited, except as by the claims set forth below.

What is claimed is:

1. An apparatus of a trusted wireless-local-area-network access gateway (TWAG) configured to operate in an evolved packet core (EPC), the TWAG comprising one or more processors configured to:
   receive data via an S2a interface from a packet-data-network gateway (PDN-GW);
   send the data to a user equipment (UE) via an access point (AP) in a Wireless Local-Area Network (WLAN);
   process control signaling with the UE based on WLAN Link-Control-Protocol (WLCP) messages;
   detect when the UE has lost connectivity with the WLAN based on a trigger communication received at the TWAG from the AP; and
   send a suspension communication to the PDN-GW when said loss of connectivity is detected.

2. The apparatus of claim 1, wherein the trigger communication is received via an L2 transport or an L3 transport and comprises at least one of: an IP address of the UE, a media-access-control (MAC) address, or a reason for the loss of connectivity.

3. The apparatus of claim 1, wherein the suspension communication is contained in a modify session request.

4. The apparatus of claim 1, wherein the PDN-GW is configured to suspend sending the data to the UE via the S2a interface upon receiving the suspension communication.

5. The apparatus of claim 1, further comprising one or more digital memory devices, the one or more digital memory devices being configured to store PDN context information relating to the UE.

6. The apparatus of claim 5, wherein when the one or more processors detects that the UE has lost the connectivity with the WLAN, the PDN context information is not deleted from the one or more digital memory devices for a predefined period of time.

7. The apparatus of claim 6, wherein the one or more processors are further configured to:
   detect when the UE has regained connectivity with the WLAN within the predefined period of time after the one or more processors have first detected that the UE has lost connectivity with the WLAN; and
   send a resumption communication to the PDN-GW.

8. The apparatus of claim 7, wherein the resumption communication is contained in a modify session request.

9. The apparatus of claim 7, wherein the one or more processors are further configured to detect when the UE has regained the connectivity with the WLAN based on a WLAN-link-control-protocol (WLCP) communication received from the UE.

10. The apparatus of claim 9, wherein the WLCP communication comprises at least one of an IP address previously assigned to the UE or a user-plane-connection identifier previously allocated to the UE.

11. The apparatus of claim 10, wherein the one or more processors are further configured to:
   retrieve the PDN context information from the one or more memory devices based on the WLCP communication; and use the PDN context information to restore a PDN connection between the UE and the PDN-GW.

12. The apparatus of claim 11, wherein the one or more processors are further configured to send a WLCP-PDN-connectivity-completion communication to the UE once the PDN connection between the UE and the PDN-GW has been restored.

13. An apparatus of a user equipment (UE) configured to support a multi-legged or a multi-access packet-data-network (PDN) connection with a plurality of radio access technologies (RATs), the apparatus comprising circuitry configured to:
   communicate with an evolved node B (eNB) in a cellular network and with an access point (AP) in a wireless local area network (WLAN), wherein the WLAN is configured to communicate with a trusted wireless-local-area-network access gateway (TWAG) and the TWAG is configured to communicate with a packet-data-network gateway (PDN-GW) of the cellular network via an S2a interface; and
   detect when the UE has lost connectivity with the WLAN; and
   send a WLAN-connectivity-loss communication to the PDN-GW via the eNB when the loss of connectivity with the WLAN has been detected.

14. The apparatus of claim 13, wherein the PGN-GW is configured to suspend a PDN connection to the UE via the S2a interface upon receiving the WLAN-connectivity-loss communication.

15. The apparatus of claim 14, wherein the circuitry is further configured to:
   detect when the UE has regained connectivity with the WLAN within a predetermined time after first detecting the loss of connectivity with the WLAN; and
   send a WLAN-link-control-protocol (WLCP) communication to the TWAG, the WLCP communication indicating that the UE wishes to resume the PDN connection.

16. The apparatus of claim 15, wherein the WLCP communication comprises at least one of: a PDN address, a PDN connection ID, a user plane connection ID, or a plurality of protocol-configuration-options (PCO) parameters.

17. The apparatus of claim 13, wherein the circuitry is further configured to communicate with the eNB using a first leg of a multi-legged PDN connection and with the AP using a second leg of the multi-legged PDN connection.

18. The apparatus of claim 17, wherein the first leg of the multi-legged PDN connection uses at least one of the following radio access technologies (RATs): Wideband Code Division Multiple Access (WCDMA), Institute of Electrical and Electronics Engineers (IEEE) 802.16 Worldwide Interoperability for Microwave Access (WiMAX), or Third Generation Partnership Project (3GPP) standard RAT.

19. The apparatus of claim 17, wherein the second leg of the multi-legged PDN connection uses at least one of the following radio access technologies (RATs): Institute of Electrical and Electronics Engineers (IEEE) 802.11 Wireless Local-Area Network (WLAN), IEEE 802.16 Worldwide Interoperability for Microwave Access (WiMAX), or Bluetooth.

20. A non-transitory computer-readable medium having instructions thereon which, when executed by one or more processors, perform the following:
   receiving a trigger communication at a trusted wireless-local-area-network access gateway (TWAG) from an access point (AP) in a Wireless Local-Area Network (WLAN);
   detecting that a UE has lost connectivity with the WLAN based on the trigger communication;
   sending a suspension communication to a packet-data-network gateway (PDN-GW); and
   storing PDN context information associated with the UE for a predefined period of time.

21. The non-transitory computer-readable medium of claim 20, further comprising instructions thereon which, when executed by one or more processors, perform the following:
   receiving the trigger communication via an L2 transport or an L3 transport, the trigger communication comprising at least one of: an IP address of the UE, a media-access-control (MAC) address, or a reason for the loss of connectivity.

22. The non-transitory computer-readable medium of claim 20, further comprising instructions thereon which, when executed by one or more processors, perform the following:
   detecting when the UE has regained connectivity with the WLAN within the predefined period of time; and
   sending a resumption communication to the PDN-GW.

23. The non-transitory computer-readable medium of claim 22, wherein at least one of the suspension communication or the resumption communication is contained in a modify session request.

24. The non-transitory computer-readable medium of claim 22, further comprising instructions thereon which, when executed by one or more processors, perform the following:
   detecting when the UE has regained the connectivity with the WLAN based on a WLAN-link-control-protocol (WLCP) communication received from the UE, wherein the WLCP communication comprises at least one of an IP address previously assigned to the UE or a user-plane-connection identifier previously allocated to the UE.

* * * * *